United States Patent Office 3,496,183
Patented Feb. 17, 1970

3,496,183
β-GUANIDINO-ETHYL-PIPERAZINE
DERIVATIVES
Lajos Toldy, Istvan Toth, Jozsef Borsi, Marton Fekete, Katalin Szilagyi, nee Farago, and Istvan Bitter, Budapest, Hungary, assignors to Egyesult Gyogyszer-es Tapszergyar, Budapest, Hungary
No Drawing. Continuation-in-part of application Ser. No. 507,355, Nov. 12, 1965. This application Mar. 19, 1969, Ser. No. 808,699
Int. Cl. C07d 99/00; A61k 27/00
U.S. Cl. 260—268                                                 4 Claims

ABSTRACT OF THE DISCLOSURE

Novel guanidine derivatives of the general formula

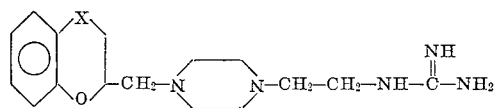

wherein X is oxygen or sulphur and their addition salts with pharmaceutically acceptable acids. The novel compounds possess pronounced antihypertensive activity.

CROSS-REFERENCE TO PRIOR APPLICATIONS

This is a continuation-in-part of our copending application Ser. No. 507,355, filed Nov. 12, 1965, now abandoned.

SUMMARY OF THE INVENTION

This invention relates to novel guanidine derivatives and processes for their preparation. The inventive compounds are represented by the formula

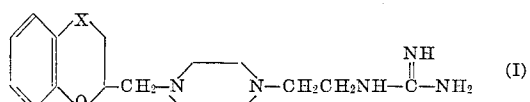

wherein X stands for oxygen or sulfur.

The addition of salts of the compounds of Formula I with pharmaceutically acceptable acids are also included within the scope of this invention. Such pharmaceutically acceptable acids are, for example, hydrochloric acid, sulfuric acid, maleic acid, fumaric acid and 1,1′-methylene-bis-(2-naphthol-3-carboxylic acid).

The invention also embraces all possible stereoisomers and their mixtures, respectively, of the novel guanidine derivatives according to the general Formula I.

According to one aspect of the present invention, there are thus proposed the new guanidine derivatives and their acid addition salts.

Pursuant to a second aspect of the present invention, there are provided processes for producing the new compounds as well as for producing therefrom preparations useful for medical application.

The novel compounds which thus are saturated heterocyclics as distinguished from unsaturated ones, possess pronounced therapeutic activity, specifically antihypertensive activity based on their adrenergic nerve blocking activity. The antihypertensive activity of the novel compounds is pronounced both on normotensive and hypertensive animals. The compounds have the advantageous effect that, in contradistinction to know compounds having adrenergic nerve blocking activity, they promptly cause a durable decrease in the tension, without any initial increase in the tension. This property is very advantageous from a therapeutical point of view.

The inventive compounds are not alpha- or beta-adrenergic blocking agents, but exert an adrenergic neuron (nerve) blocking effect which, on the one hand, inhibits the liberation of nor-adrenaline on the sympathetic nerve endings and, on the other hand, causes the depletion of the transmitter substance.

The compounds according to the invention thus have a remedial effect in the therapy of hypertony.

The dose to be employed is the same as customarily used in case of similar drugs having adrenergic neuron-blocking effect. Accordingly, in order to obtain an effective antihypertensive effect, in animals doses from 0.25 to 0.5 mg./kg. should be administered intravenously, from 2.5 to 5 mg./kg. subcutaneously, and from 15 to 20 mg./kg. orally. In human therapy, peroral administration in amounts of 30–150 mg./kg. has been shown to be effective.

The compounds according to the invention can be used with various forms of hypertony, similarly to other compounds having adrenergic neuron-blocking effect, such as guanidine proper.

The compounds according to the invention have no acetylcholineesterase-blocking effect. The neuron-blocking effect of the compounds is directed solely to the sympathetic ganglionary nerve fibers.

All the addition salts of the compounds having the general Formula I of which the hydrochlorides, sulphates, maleates, fumarates and 1,1′-methylene-bis-(2-naphthol-3-carboxylates) were mentioned as examples, are pharmaceutically acceptable.

The guanidine derivatives of this invention can be prepared by reacting the compounds having the general Formula II

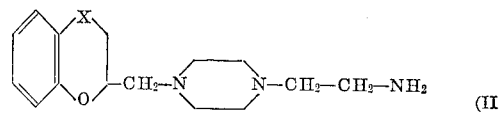

wherein X has the same meaning as above, with a reagent which is capable of transforming the NH₂ group to a guanidino group. Such reagents are, for example, the S-alkyl-isothiocarbamides, their salts, and the cyanamide. Other well known reagents such as described, for example, in Houben-Weyl: "Methoden der organischen Chemie," vol. 3, p. 180 (Georg Thieme, Stuttgart, 1952) or in the paper of James H. Short et al. (J. of Med. Chem. 6, 275, 1963), may also be employed.

The starting compounds of the general Formula II are also new compounds. They can be prepared by any method known per se. For their synthesis it is preferable to use as one component a compound having the general Formula III

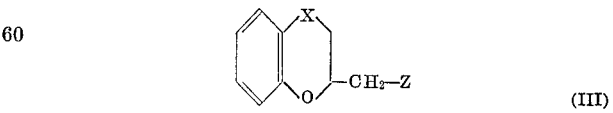

wherein X has the same meaning as above and Z stands for an active ester group, such as a halogen atom or a sulphonyloxy group. These compounds can then be coupled with piperazine, whereby the compounds having the general Formula IV

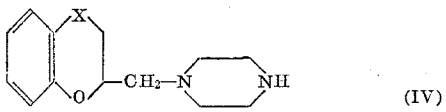

wherein X has the same meaning as above, are obtained, whereafter the group —CH₂—CH₂—NH₂ is introduced into the NH-group of the piperazine in a way known per se. For this purpose, it is preferable to couple the compounds having the general Formula IV with N-beta-bromoethyl-phthalimido and to react the thus obtained N-beta-phthalimido-ethyl derivative with hydrazine.

According to another method, the starting compounds having the general Formula II can be prepared by coupling the compounds having the general Formula III, wherein X and Z have the same meanings as above, with N-beta-phthalimido-ethyl-piperazine, and from the thus obtained compounds the starting compounds having the general Formula II are prepared in the above-described manner.

The process according to the invention is further illustrated by the aid of the following examples.

EXAMPLE 1

Preparation of 2 - [4' - (beta-guanidino-ethyl)-piperazinyl-1]-methylbenzo-1,4-dioxane-sulphate.

(a) 441 g. of 2-oxymethyl-5,6-benzo-1,4-dioxane are dissolved in 800 ml. of pyridine. The dioxane has the formula

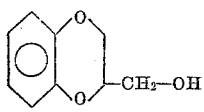

and can be prepared on the basis of the following literature data: Lindemann: Ber. 24, 2149 (1891); Moureau: Comp. Rend. 126, 1427 (1898).

The analogous thioxane derivative

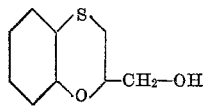

can be prepared according to German patent specification No. 1,167,851.

While ice-cooling is carried out, 270 ml. of methanesulphorchloride are added in several portions. The reaction mixture is cooled with ice for further 60 minutes, whereafter it is allowed to warm up to room temperature, whereupon crystals are separated. The mixture is poured into 4 liters of water. The separated oil is washed with water. The water is decanted and the oil is taken up with chloroform. The cholorofrom solution is shaken with diluted sulphuric acid, then with water and it is dried over sodium sulphate and the choloroform is distilled off. The residue consists of 531 g. of 2-oxymethyl-5,6-benzo-1,4-dioxane-mesylester which recrystallizes while standing. After recrystallization from methanol the product melts at 56–58° C.

(b) 64 g. of anhydrous piperazine are boiled with 300 ml. of abs. xylene while stirring and in 2 hours 61 g. of the mesylester prepared according to step (a), dissolved in 150 ml. of abs. xylene, are added to its dropwise. After boiling for another 2 hours, the mixture is cooled and shaken out first with water and then with 2 N hydrochloric acid solution. The acidic extract is made alkaline, whereupon an oil is separated which is taken up with chloroform and distilled off. In this manner, 40.2 g. of 2-piperazino-methyl-5,6-benzo-1,4-dioxane are obtained, with a boiling point of 190–190° C./3 mm.

(c) 48.6 g. of the compound obtained according to step (b) and 50.6 g. of bromoethylphthalimide are boiled with 30 ml. of triethylamine in 400 ml. of abs. xylene for 4 hours. After cooling, the mixture is shaken out with water and thereafter with 2 N hydrochloric-acid solution. The acidic extract is made alkaline while cooling with ice water, whereupon a syrup is separated which is taken up with chloroform, and the chloroform is then distilled off. The residue is recrystallized from abs. ethanol. The obtained 51 g. of 2-[4'-(beta-phthalimido-ethyl)-piperazinyl-1]-methyl-5,6-benzo-1,4-dioxane melts at 100–102° C.

(d) 68 g. of the phthalimido compound obtained according to step (c) are boiled for an hour while stirring with 31 g. of 89% hydrazine hydrate in 400 ml. of abs. ethanol. The separated voluminous precipitate is filtered with suction after cooling and washed with abs. ethanol. The alcoholic mother liquors are combined and evaporated. The residue is distilled off. In this manner, 40 g. of 2 - [4 - (beta-amino-ethyl) - piperazinyl-1']-methyl-5,6-benzo-1,4-dioxane are obtained, with a boiling point of 190–195° C./0.2 mm.

(e) 8.3 g. of the product obtained in step (d) are boiled in 21 ml. of water for 2 hours together with 4.17 g. of S-methyl-isothiocarbamide-sulphate. After cooling, crystals are precipitated which, after standing at 0° C. for a night, are filtered with suction and washed with water. In this manner, 9.5 g. of crude 2-[4'-beta-guanidino-ethyl) - piperazinyl-1']-methyl-5,6-benzo-1,4-dioxane-sulphate are obtained which, after recrystallizing from water, melt at 250–252° C. with decomposition.

EXAMPLE 2

58.8 g. of phthalic-anhydride and 51.6 g. of N-(beta-aminoethyl)-piperazine are converted into N-(beta-phthalimido-ethyl)-piperazine in a known manner (Hideg and Hankovszky, Acta Chim. Acad. Sci. Hung. 39, 391, 1963). The obtained crude product is boiled in 350 ml. of abs. xylene while stirring together with 60 ml. of triethylamine. Thereafter, 100 g. of the mesylester according to step (a) of Example 1 in 150 ml. of abs. xylene are added dropwise to the reaction mixture in 2 hours. After further stirring and boiling for 12 hours, the cooled mixture is shaken out with water and then with 2 N hydrochloric acid solution. In the following, one proceeds as described in step (c) of Example 1, whereafter the same intermediate product is obtained in an amount of 120 g. This product is converted into the desired end product according to the method described in steps (d) and (e) of Example 1.

EXAMPLE 3

8.7 g. of 2-[4'-(beta-aminoethyl) - piperazinyl - 1']-methyl-5,6-benzo-1,4-oxathiane (B.P. at 0.2 mm.: 140–144° C.) are dissolved in 25 ml. of water and after adding 4.2 g. of S-methyl-isothiocarbamide-sulphate, the reaction mixture is boiled for 2 hours. After cooling, the solution is made alkaline with sodium-hydroxide solution and the separated product is taken up with chloroform. The chloroform is distilled off and the obtained crude 2-[4'-(beta-guanidino-ethyl)-piperazinyl-1']-methyl-5,6-benzo-1,4-oxathiane is converted in a dilute ethanolic solution to the fumarate salt which melts at 230–235° C. with decomposition.

What is claimed is:

1. A guanidino compound selected from the class consisting of the free bases and their addition salts with pharmaceutically acceptable acids, the said free bases having the following formula

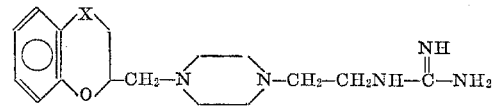

wherein X is oxygen or sulphur.

2. A compound as claimed in claim 1, wherein the pharmaceutically acceptable addition salts are the hydrochlorides, sulphates, maleates, fumarates and 1,1'-methylene-bis-(2-naphthol-3-carboxylates).

3. 2-[4'-(beta-guanidino-ethyl)-piperazinyl-1']-methyl-5,6-benzo-1,4-dioxane-sulphate.

4. 2-[4'-(beta-guanidino-ethyl)-piperazinyl-1']-methyl-5,6-benzo-1,4-oxathiane.

References Cited

UNITED STATES PATENTS

| | | | |
|---|---|---|---|
| 3,098,066 | 7/1963 | Mull | 260—268 X |
| 3,119,826 | 1/1964 | Reanier et al. | 260—268 |
| 3,247,221 | 4/1966 | Auastein | 260—309.6 |
| 3,362,956 | 1/1968 | Archer | 260—268 |

FOREIGN PATENTS 6,515,072  5/1966  Netherlands.

DONALD G. DAVSS, Primary Examiner

U.S. Cl. X.R.

424—250; 260—326, 327, 340.3,